Figure 1:
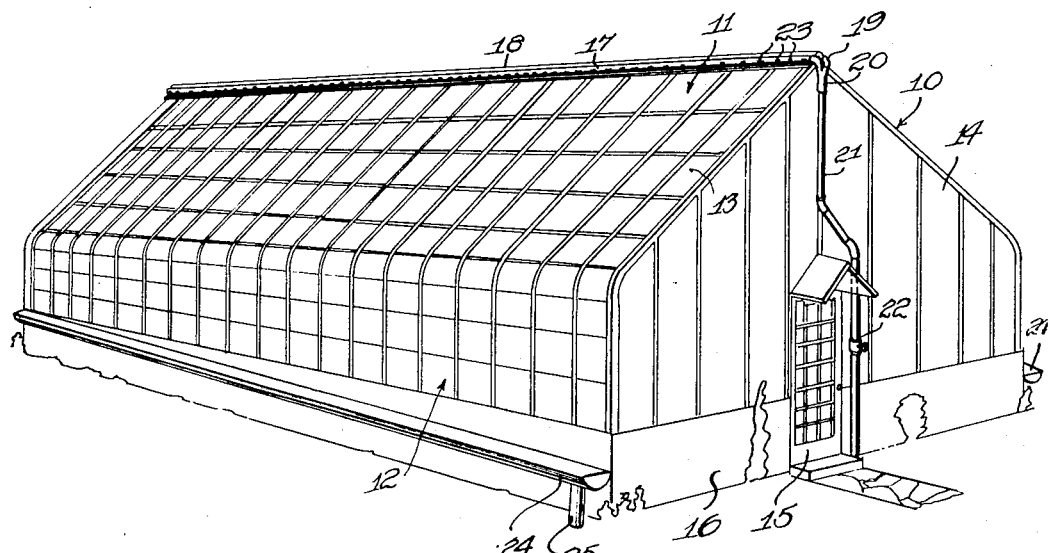

Nov. 28, 1933.  H. L. RENARD  1,936,732
METHOD AND APPARATUS FOR PROTECTING GLASS PANES FROM INJURY

Filed Nov. 27, 1928

Inventor
HENRY L. RENARD
By C. L. Parker Jr.
Attorney

Patented Nov. 28, 1933

1,936,732

UNITED STATES PATENT OFFICE 1,936,732

METHOD AND APPARATUS FOR PROTECTING GLASS PANES FROM INJURY

Henry L. Renard, Pearl River, N. Y.

Application November 27, 1928
Serial No. 322,289

6 Claims. (Cl. 108—1)

This invention relates to a method and apparatus for protecting glass panes from injury, the invention having particular reference to greenhouses and similar constructions.

In the maintenance of greenhouses, hail storms have always been a source of great menace, and hail storms often cause material damage to greenhouses and the contents thereof. The hail storms not only fracture and thus destroy the panes of glass enclosing the greenhouses, but they also cause considerable damage to the plants. The falling fragments of glass also constitute a source of danger to workmen within the greenhouses. When a destructive hail storm occurs prior to busy seasons in the florists' trade, such as Christmas, Easter, etc., the loss in flowers and plants is quite considerable aside from the damage resulting to the greenhouse itself.

I have discovered that the presence of a sheet of water on the surface of greenhouse glasses affords substantial protection against injury from falling objects such as hail stones and the like. When a sheet of water is caused to flow over the surface of the glass panes, the water affords a substantial and surprising resistance against penetration by hail stones and the like.

Accordingly, the present invention has for its object the provision of a method of protecting greenhouses and similar glass enclosures or panes of glass against injury by causing a sheet of water to flow over the surface of the glass and thus protect the latter from injury.

A further object is to provide novel apparatus for use in practicing the method, whereby a sheet of water may be caused to flow constantly over the glass surface to afford protection therefor.

In practicing the method, I provide piping means for supplying water or other liquid to a greenhouse adjacent the top thereof. The piping means may be connected to any suitable source of water supply as will be apparent. A suitable valve is provided for preventing the flow of water until it is desired to protect the greenhouse from injury. Suitable nozzles are connected to the piping means for distributing water substantially evenly over the glass panes of the greenhouse, and the flow of water through the nozzles may be maintained throughout a hail storm with the result that the panes of glass are protected from injury, and loss is thus prevented.

When running water is not available, and cisterns are employed for the storage of water for irrigating the plants in greenhouses, the water sprayed on the greenhouse in the practice of the present method may be collected in suitable gutters and returned to the cistern for re-use.

In the drawing I have shown one organization of apparatus elements adapted for practicing the method. In this way, Figure 1 is a perspective view of a greenhouse showing the apparatus applied, Figure 2 is a fragmentary side elevation of a portion of a greenhouse, and, Figure 3 is a section taken substantially on line 3—3 of Figure 2.

Referring to the drawing the numeral 10 designates a greenhouse having sloping roof portions 11 and side walls 12 each of which is made up of a plurality of glass panes 13 in the usual manner. The end walls 14 also are closed in the usual manner, and one end of the greenhouse is provided with a door 15. The greenhouse rests upon a suitable base or foundation 16.

The structure just described constitutes a greenhouse of ordinary construction and forms no part of the present invention. As will become apparent, the invention is applicable to a greenhouse of any construction, or to other structures or enclosures employing panes of glass.

Figure 2:
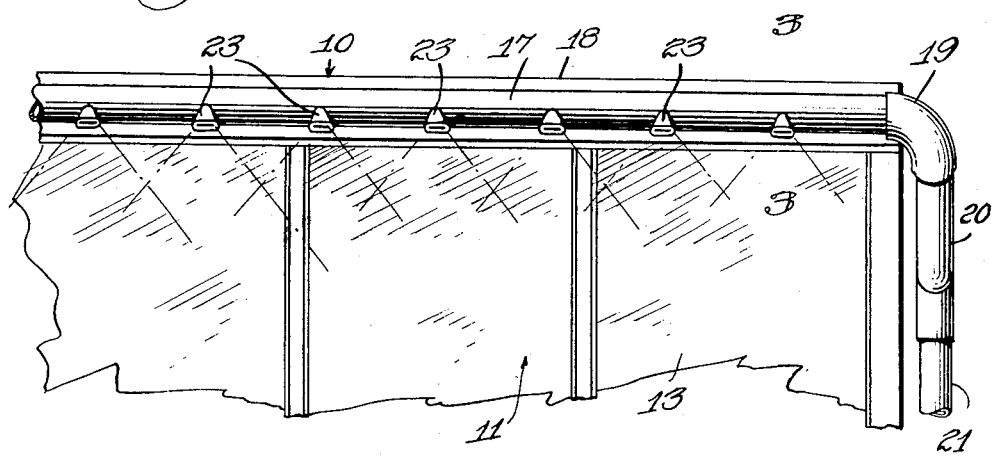
Figure 3:
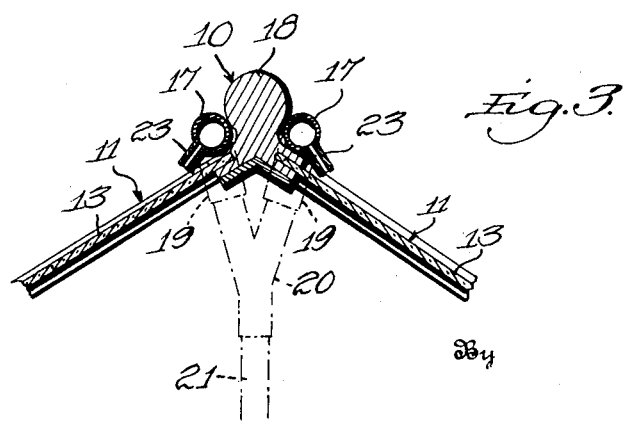

Referring to Figures 2 and 3, the numeral 17 designates a pair of distributing pipes arranged on opposite sides of and preferably secured to the ridge piece 18 of the greenhouse. The pipes 17 are connected at one end by elbows 19 to a Y 20, the lower end of which communicates with a supply pipe 21. A valve 22 is arranged in the supply pipe for controlling the flow of water therethrough.

Means is preferably provided for securing an even distribution of water over the roof portions of the greenhouse, and in Figures 2 and 3 of the drawing, I have illustrated nozzles 23 for this purpose. The nozzles are preferably fan-shaped and are provided with flat spray openings to project flat sheets of water downwardly upon the glass panes.

Troughs 24 are preferably arranged at opposite sides of the greenhouse to collect the water flowing from the roof. These troughs are provided with take-off pipes 25. Where cisterns are employed for supplying water to the greenhouses for irrigation purposes, the take-off pipes 25 may be connected to the cisterns to return the water thereto.

The operation of the apparatus is as follows:

Upon the commencing of a hail storm, the valve 22 may be opened to supply water to the distributing pipes 17. The water will be discharged through the nozzles 23 and thus will flow downwardly upon the panes 13. As previously stated, fan-shaped nozzles of the character described are preferably employed to spread the water evenly in the form of a sheet substantially covering the roof and side walls of the greenhouse. The water serves to deflect the hail stones from the panes, and in practice it has been found that a sheet of water one-eighth of an inch or more in depth affords substantial protection to the glass panes. The sheet of water possesses a surprising degree of resistance against penetration by falling objects such as hail stones and the like, and accordingly when the device is in operation, the glass panes are protected against breakage during hail storms.

As previously stated, the injury to the plants as well as to the greenhouse causes a substantial loss to the florists, and these losses are prevented by the use of the present device. Possible injury to workers within the greenhouse because of the presence of glass fragments also is prevented. Damage to the end walls of a greenhouse seldom occurs because of the acute angle at which hail stones strike thereagainst. If desired, however, nozzles also may be provided for covering the end walls with a sheet of water during a hail storm to provide positive protection.

From the foregoing it will be apparent that the present method consists in covering the fragile glass panes with a flowing substance such as water or other liquid to prevent breakage of the fragile material. In the case of a sloping surface such as the roof of a greenhouse, the water is supplied thereto in a constant flow to maintain a sheet of the protecting liquid thereon.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:
1. The method of protecting inclined window glass against breakage by solid objects which comprises supplying a liquid to a high portion of an exposed surface of the glass to maintain a sheet of liquid approximately one-eighth inch in depth on such surface of the glass.
2. The method of protecting inclined window glass against breakage by solid objects which comprises supplying a liquid to a high portion of an exposed surface of the glass to maintain a sheet of liquid of a depth greater than one-eighth inch on said exposed surface of the glass.
3. The method of protecting inclined window glass against breakage by solid objects which comprises flowing a sheet of liquid of approximately one-eighth inch in depth across an exposed surface of the glass from the higher portion thereof to the lower portion.
4. The method of protecting inclined window glass against breakage by solid objects which comprises flowing a sheet of liquid greater than one-eighth inch in depth across an exposed surface of the glass from the higher portion thereof to the lower portion.
5. The method of protecting the sloping glass roofs of greenhouses against breakage by hail stones and the like which comprises supplying a liquid to the high points of the roof in a plurality of jets to substantially cover the roof with a sheet of liquid to a depth of approximately one-eighth inch.
6. The method of protecting the sloping glass roofs of greenhouses against breakage by hail stones and the like which comprises supplying a liquid to the high points of the roof in a plurality of jets to substantially cover the roof with a sheet of liquid to a depth greater than one-eighth inch.

HENRY L. RENARD.